(12) United States Patent
Azuma et al.

(10) Patent No.: US 9,366,007 B2
(45) Date of Patent: Jun. 14, 2016

(54) CONSTRUCTION MACHINE

(71) Applicant: HITACHI CONSTRUCTION MACHINERY CO., LTD., Tokyo (JP)

(72) Inventors: Hiroyuki Azuma, Ushiku (JP); Takahiro Kobayashi, Tsuchiura (JP); Jun Yamabayashi, Tsuchiura (JP); Satoshi Tehara, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/373,929

(22) PCT Filed: Mar. 11, 2013

(86) PCT No.: PCT/JP2013/056590
§ 371 (c)(1),
(2) Date: Jul. 23, 2014

(87) PCT Pub. No.: WO2013/137169
PCT Pub. Date: Sep. 19, 2013

(65) Prior Publication Data
US 2015/0016932 A1 Jan. 15, 2015

(30) Foreign Application Priority Data
Mar. 16, 2012 (JP) ................................ 2012-060494

(51) Int. Cl.
E02F 9/08 (2006.01)
E02F 3/30 (2006.01)
(Continued)

(52) U.S. Cl.
CPC ................. *E02F 9/0858* (2013.01); *E02F 3/30* (2013.01); *E02F 9/0833* (2013.01); *E02F 9/0883* (2013.01); *E02F 9/0891* (2013.01); *E02F 9/121* (2013.01); *B01D 53/9431* (2013.01); *B01D 53/9477* (2013.01); *B01D 2251/2067* (2013.01); *B01D 2258/012* (2013.01); *B60K 11/04* (2013.01); *B60K 13/04* (2013.01); *B60Y 2200/412* (2013.01); *F01N 3/2066* (2013.01);
(Continued)

(58) Field of Classification Search
CPC combination set(s) only.
See application file for complete search history.

(56) References Cited

U.S. PATENT DOCUMENTS 7,780,213 B2 * 8/2010 Kim .......................... E02F 9/00 296/37.6
7,988,167 B2 * 8/2011 Sakitani .................... B60R 3/00 280/163

(Continued)

FOREIGN PATENT DOCUMENTS

BE 2011/152223 A1 12/2011
JP 2008-240676 A 10/2008

(Continued)

*Primary Examiner* — Nicole Verley
(74) *Attorney, Agent, or Firm* — Mattingly & Malur, PC

(57) ABSTRACT

A first accommodating case (13) which is located more forward than a fuel tank (12) and is small in height dimension (H1) of an upper surface (13E) is provided on the right side of a revolving frame (5). A second accommodating case (16) the position of an upper surface (16E) of which is higher than the upper surface (13E) of the first accommodating case (13) and is lower than an upper surface plate (12E) of the fuel tank (12) is provided on the rear side of the upper surface (13E) of this first accommodating case (13). Moreover, a reducing agent tank (20) is provided in a tank accommodating space (15) in the first accommodating case (13) and articles such as a tool box (23) and the like are accommodated in an article accommodating space (17) in the second accommodating case (16).

8 Claims, 10 Drawing Sheets

(51) Int. Cl.
*E02F 9/12* (2006.01)
*F01N 3/20* (2006.01)
*B01D 53/94* (2006.01)
*B60K 13/04* (2006.01)
*B60K 11/04* (2006.01)

(52) U.S. Cl.
CPC ..... *F01N 2590/08* (2013.01); *F01N 2610/1406* (2013.01)

(56) References Cited

U.S. PATENT DOCUMENTS

| | | | | |
|---|---|---|---|---|
| 8,177,387 | B2 * | 5/2012 | Noda | E02F 9/00 224/401 |
| 8,186,156 | B2 * | 5/2012 | Kamiya | B01D 53/9431 180/305 |
| 8,661,793 | B2 * | 3/2014 | Yamashita | B60K 13/04 60/286 |
| 8,708,087 | B2 * | 4/2014 | Kashu | B60K 13/04 180/291 |
| 8,973,692 | B1 * | 3/2015 | Okuda | B60L 11/1877 180/68.5 |
| 9,027,688 | B2 * | 5/2015 | Okuda | B60K 13/04 180/89.2 |
| 9,027,697 | B2 * | 5/2015 | Kobayashi | E02F 9/0875 180/296 |
| 2010/0206927 | A1 * | 8/2010 | Noda | E02F 9/00 224/401 |
| 2012/0067660 | A1 * | 3/2012 | Kashu | B60K 13/04 180/296 |
| 2013/0071295 | A1 | 3/2013 | Terakawa et al. | |
| 2015/0016932 | A1 * | 1/2015 | Azuma | E02F 9/0833 414/687 |

FOREIGN PATENT DOCUMENTS

| | | | |
|---|---|---|---|
| JP | 2010-236208 A | 10/2010 | |
| JP | 2011-012661 A | 1/2011 | |
| WO | 2011-058247 A | 3/2011 | |
| WO | WO 2012073872 A1 * | 6/2012 | ............ E02F 9/0858 |
| WO | WO 2013179696 A1 * | 12/2013 | ............ E02F 9/0833 |
| WO | WO 2015053273 A1 * | 4/2015 | ............ B60K 15/063 |

* cited by examiner

CONSTRUCTION MACHINE

TECHNICAL FIELD

The present invention relates to a construction machine such as, for example, a hydraulic excavator on which a reducing agent tank for storing a liquid reducing agent such as urea water and the like is loaded.

BACKGROUND ART

In general, the hydraulic excavator which is a representative example of the construction machine is configured by an automotive lower traveling structure, an upper revolving structure which is revolvably loaded on the lower traveling structure and a working mechanism tiltably provided on the front side of the upper revolving structure and at an intermediate position in a left-right direction.

The upper revolving structure is equipped with a revolving frame which forms a supporting structure member, an engine loaded on the rear side of the revolving frame and a cab provided to be put aside to the left front side of the aforementioned revolving frame which is the left side of the aforementioned working mechanism. An operator's seat on which an operator sits and the like are provided in this cab.

A mounting bracket which is located on the front side and adapted to mount the working mechanism is provided at the intermediate position in the left-right direction of the revolving frame. An oil storage tank such as a fuel tank for storing a fuel, a hydraulic oil tank for storing hydraulic oil or the like is provided on the right side of the revolving frame which is opposite to the cab with the working mechanism interposed. This oil storage tank is arranged such that its front end is located more rearward than the mounting bracket of the revolving frame.

On the other hand, a diesel engine is used as the engine of the hydraulic excavator. This diesel engine is said to emit much nitrogen oxides (hereinafter, referred to as NOx) and the like. Therefore, there exists a NOx purifying device for purifying NOx as a post-processing device for exhaust gas from the diesel engine. This NOx purifying device is configured by a urea selective reduction catalyst provided, for example, in an exhaust pipe of the engine to remove the nitrogen oxides in the exhaust gas, a reducing agent tank for storing a urea water solution as a reducing agent, a urea water injection valve for injecting the urea water solution in the reducing agent tank toward the upstream side of the urea selective reduction catalyst, and connecting piping for connecting together the aforementioned reducing agent tank and the urea water injection valve.

Here, in a case where the reducing agent tank is to be provided on the hydraulic excavator, it is desirable to set the capacity large in order to reduce the water supply frequency. However, since many devices are loaded on the hydraulic excavator, it is difficult to secure a space for newly installing the reducing agent tank. Accordingly, there is known the one configured to accommodate the reducing agent tank in an article accommodating case for accommodating tools and the like in prior art hydraulic excavators (Patent Document 1 and Patent Document 2). Further, as an arrangement place of the reducing agent tank, there is known the one configured to arrange it around the oil storage tank (Patent Document 3).

PRIOR ART DOCUMENT

Patent Document

Patent Document 1: Japanese Patent Laid-Open No. 2011-12661 A
Patent Document 2: Japanese Patent Laid-Open No. 2008-240676 A
Patent Document 3: Japanese Patent Laid-Open No. 2010-236208 A

SUMMARY OF THE INVENTION

Incidentally, in the ones according to the above-mentioned Patent Documents 1 and 2, since they are configured to accommodate the reducing agent tank in the article accommodating case, in a case where the capacity of the reducing agent tank has been increased, the space for accommodating the articles is reduced in the article accommodating case. Therefore, there are such problems that usability when taking tools and consumption articles into/out of the article accommodating case is worsened and, in addition, it becomes impossible to accommodate them in plenty.

On the other hand, in a case where the reducing agent tank has been accommodated in the article accommodating case, there are such problems that there are cases where it becomes difficult to access to the reducing agent tank by being obstructed by the tools and the like in the article accommodating case and time and labor are taken for work of supplying water into the reducing agent tank.

Further, in Patent Document 3, the reducing agent tank is arranged around the oil storage tank in an exposed state. Therefore, since the reducing agent tank is exposed to rain water and snow, there are such problems that there are cases where damage and corrosion of the tank, freeze of the urea water and the like occur and, in addition, mischief cannot be prevented.

In view of the above-discussed problems with the conventional art, it is an object of the present invention to provide a construction machine capable of readily performing taking in/out of the tools and the consumption articles, work of supplying water into the reducing agent tank and the like and capable of protecting the reducing agent tank from damage, corrosion, freeze of the urea water, mischief and the like.

(1) The construction machine according to the present invention comprising: an automotive lower traveling structure; an upper revolving structure which is revolvably loaded on the lower traveling structure; and a working mechanism which is tiltably provided on the front side of the upper revolving structure at an intermediate position in a left-right direction, wherein the upper revolving structure is equipped with a revolving frame located on the front side and provided with mounting brackets adapted to mount the working mechanism to the intermediate position in the left-right direction via a connecting pin, and an oil storage tank a front end of which is located more rearward than the mounting brackets of the revolving frame and which is arranged by being put aside to one side in the left-right direction of the revolving frame.

A characteristic of a configuration adopted by the present invention is that a first accommodating case which is located more forward than the storage tank and is small in height dimension of an upper surface is provided on one side in the left-right direction of the aforementioned revolving frame, a second accommodating case the position of an upper surface of which is higher than the upper surface of the first accommodating case and lower than an upper surface of the oil storage tank is provided on the rear side of the upper surface of the first accommodating case or between the first accommodating case and the oil storage tank, an article accommodating space for accommodating articles is defined in one accommodating case of the aforementioned first accommodating case and the second accommodating case, and a reducing agent tank which is located in a tank accommodating space and stores a liquid reducing agent is provided in the other accommodating case of the first accommodating case and the second accommodating case.

With this arrangement, since the first accommodating case and the second accommodating case are provided independently, the article provided in the article accommodating space in one accommodating case can be readily taken in/out without being obstructed by the reducing agent tank and the usability can be made favorable. On the other hand, since only the reducing agent tank can be accommodated in the tank accommodating space in the other accommodating case, the reducing agent tank can be readily replenished with the liquid reducing agent without being obstructed by, for example, the articles such as tools and the like.

Since it is possible to make rain water and snow not fall on the reducing agent tank in a state that the reducing agent tank is accommodated in the accommodating case, durability of the reducing agent tank against damage and corrosion can be improved, the urea water can be made to hardly freeze, and it can be also protected from mischief.

In addition, since the height dimension of the upper surface of the first accommodating case is made small, and the height dimension of the upper surface of the second accommodating case which is provided on the rear side of the upper surface of this first accommodating case or between the first accommodating case and the oil storage tank is made higher than the upper surface of the first accommodating case and lower than the upper surface of the oil storage tank, the first accommodating case and the second accommodating case can be also used as a stairway used for getting on/off the upper revolving structure.

(2) According to the present invention, it is configured such that the second accommodating case is provided to be mountable/demountable to/from the first accommodating case, and an inserting/removing space adapted to insert/remove the connecting pin which connects the working mechanism to the mounting brackets is formed by demounting the second accommodating case.

With this arrangement, in a state that the second accommodating case provided to be mountable/demountable to/from the first accommodating case has been demounted from the first accommodating case, the insetting/removing space used for inserting/removing the connecting pin which connects the working mechanism to the mounting bracket can be formed. Owing to this, since the connecting pin can be inserted/removed simply by demounting only the second accommodating case in the two accommodating cases, work of attaching/detaching the working mechanism to/from the mounting brackets can be readily performed.

(3) According to the present invention, it is configured such that the revolving frame is provided with an under cover located on the bottom side, and the tank accommodating space is formed as a space between the upper surface of the accommodating case and the under cover.

With this arrangement, since the tank accommodating space can be formed by adding an accommodating space down to the under cover to the accommodating space in the first accommodating case, a large-sized reducing agent tank capable of storing a large amount of the liquid reducing agent can be accommodated in the tank accommodating space.

(4) According to the present invention, it is configured such that a water supply port is provided in the reducing agent tank so as to be open toward the front side or upper side, and an openable/closable cover in the respective accommodating cases is provided on the accommodating case in which the reducing agent tank is provided at a position where said accommodating case (13, 33) covers a water supply port of the reducing agent tank.

With this arrangement, the water supply port of the reducing agent tank can be exposed to the outside by opening the cover provided on the accommodating case and the liquid reducing agent can be replenished through this exposed water supply port. At that time, since the water supply port is open toward the front side or upper side, the liquid reducing agent can be smoothly replenished from the front-side position or the upper-side position where it can be readily replenished.

(5) According to the present invention, it is configured such that a first cover for opening/closing an opening is provided on the first accommodating cover, and a second cover for opening/closing an opening is provided on the second accommodating case. Therefore, in a state that the cover has been opened, taking in/out of the articles accommodated in the accommodating case, replenishment into the reducing agent tank and the like can be performed through the opening. On the other hand, in a state that the cover has been closed, intrusion of rain water and dust into the accommodating case and mischief to the articles and the reducing agent tank can be prevented.

(6) According to the present invention, it is configured such that a first cover which is opened/closed using a corner between a front surface and the upper surface as a fulcrum is provided on the first accommodating cover, a second cover which is opened/closed using the rear side of an upper surface as a fulcrum is provided on the second accommodating case, a slip-preventing member for preventing slip when foot has been put on is provided on the upper surface of the first accommodating case, and a slip-preventing member for preventing slip when foot has been put on is provided on an upper surface of the second cover on the second accommodating case.

With this arrangement, taking in/out of the articles, replenishment into the reducing agent tank and the like can be performed by opening the first cover provided on the first accommodating case using the corner between the front surface and the upper surface as the fulcrum. Likewise, taking in/out of the articles, replenishment into the reducing agent tank and the like can be performed by opening the second cover provided on the second accommodating case using the rear side of the upper surface as the fulcrum. On the other hand, in a state that the respective covers have been closed, intrusion of rain water and dust into the accommodating cases and mischief to the articles and the reducing agent tank can be prevented.

In addition, a stairway can be formed by using the first accommodating case as a lower-stage step and the second accommodating case as an upper-stage step. Owing to this, for example, in a case of getting on the upper side of the oil storage tank in order to perform fuel filling work, one can readily get on it by using them as the stairway by putting foot sequentially on the upper surface of the first accommodating case and the upper surface of the second cover of the second accommodating case. On the other hand, one can readily get off it by stepping foot sequentially on the upper surface of the second cover of the second accommodating case and on the upper surface of the first accommodating case. Further, since the slip-preventing members are provided on the upper surface of the first accommodating case and the upper surface of the second cover of the second accommodating case, slip when stepping foot on it can be prevented, and safety when getting on/off and workability of the fuel filling work and the like can be improved.

(7) According to the present invention, it is configured such that the second accommodating case is arranged superposing on the upper surface of the aforementioned accommodating case, the tank accommodating space is provided in the first accommodating case located on the lower side, and the reducing agent tank is accommodated in the tank accommodating space. Therefore, only the second accommodating case can be readily demounted in a state that the first accommodating case in which the reducing agent tank is accommodated is left on the revolving frame side.

(8) According to the present invention, it is configured such that a reducing agent supply pump for supplying a liquid reducing agent in the reducing agent tank to an exhaust gas purifying device is provided in the first accommodating case, and the reducing agent supply pump is arranged between a rear surface of the reducing agent tank and a rear surface of the first accommodating case. Therefore, the reducing agent supply pump can be provided by utilizing the space between the rear surface of the reducing agent tank and the rear surface of the first accommodating case, and the liquid reducing agent in the reducing agent tank can be supplied toward the exhaust gas purifying device by using this reducing agent supply pump.

(9) According to the present invention, it is configured such that the second accommodating case is arranged between the rear side of the first accommodating case and the oil storage tank, the tank accommodating space is provided in the second accommodating case, and the reducing agent tank is accommodated in the tank accommodating space. Therefore, only the second accommodating case can be readily demounted in a state that the first accommodating case in which the articles are accommodated is left on the revolving frame side.

BRIEF DESCRIPTION OF THE DRAWINGS

FIG. 9 is an enlarged perspective view of an essential part showing a first accommodating case, a second accommodating case and a reducing agent tank according to a second embodiment of the present invention together with the revolving frame, the fuel tank and the like.

MODE FOR CARRYING OUT THE INVENTION

In the following, a crawler type hydraulic excavator will be described in detail as an example of a construction machine according to embodiments of the present invention in accordance with the accompanying drawings.

FIG. 1 to FIG. 8 show a first embodiment of the present invention. In the first embodiment, a case where a reducing agent tank is configured to be accommodated in a tank accommodating space in a first accommodating case which is located on the lower side, and a second accommodating case is arranged superposing on an upper surface of the first accommodating case is exemplified.

Figure 1:
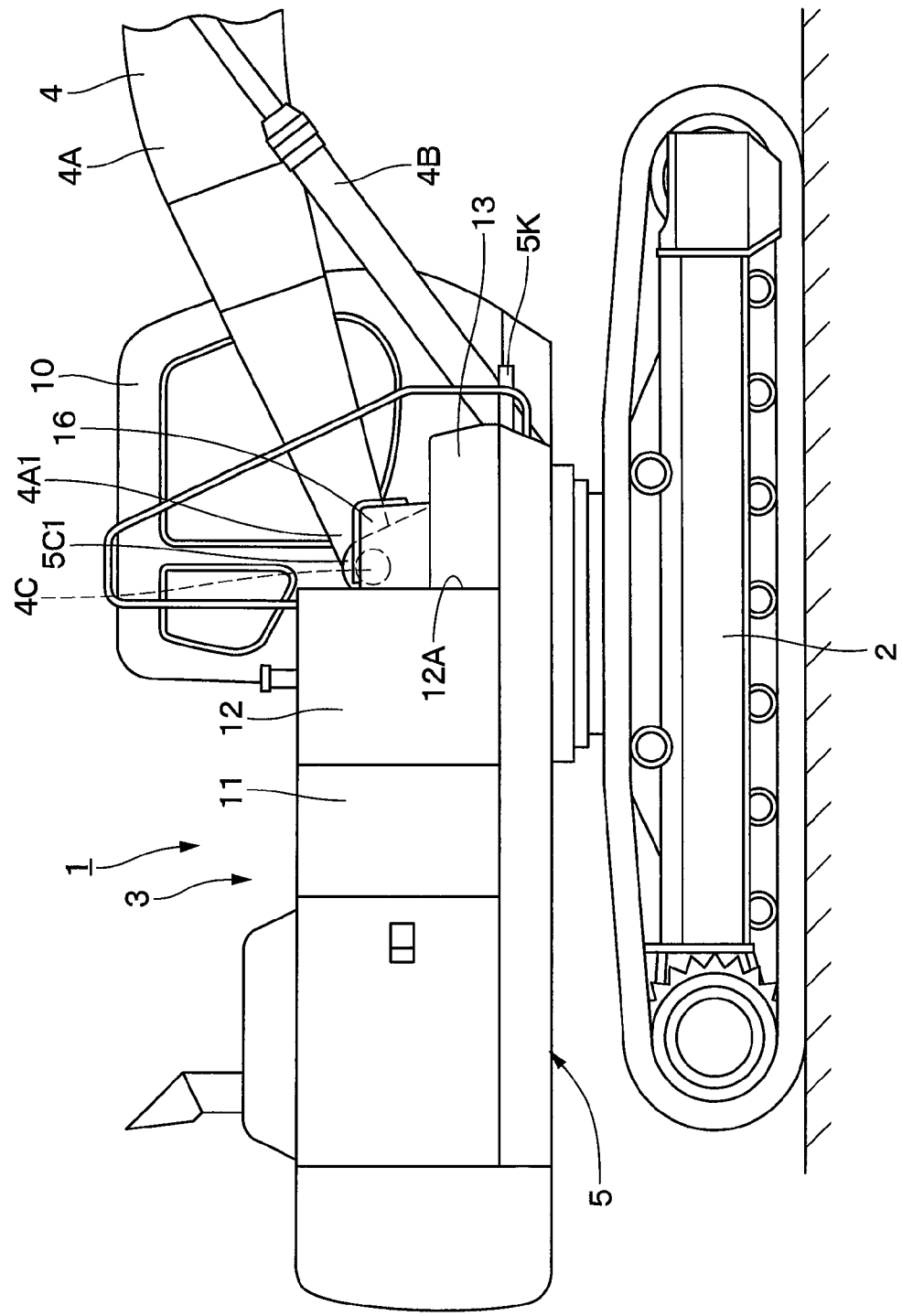
FIG. 1 is a front view showing a hydraulic excavator applied to a first embodiment of the present invention.

In FIG. 1, designated at 1 is a hydraulic excavator as a construction machine used for an excavating work of earth and sand and the like. This hydraulic excavator 1 is configured by an automotive crawler type lower traveling structure 2, an upper revolving structure 3 which is revolvably loaded on the lower traveling structure 2, and a working mechanism 4 tiltably provided on the front side of the upper revolving structure 3 at an intermediate position in a left-right direction.

The working mechanism 4 is provided with a boom 4A, and an arm and a bucket (neither of them is shown), and they are rotated by a boom cylinder 4B, and an arm cylinder and a bucket cylinder (neither of them is shown). A foot portion 4A1 which is a base end of the boom 4A is arranged between mounting brackets 5B1, 5C1 of left and right vertical plates 5B, 5C of a revolving frame 5 which will be described later. In this state, a connecting pin 4C is inserted into pin insertion holes 5B2, 5C2 in the respective vertical plates 5B, 5C and a pin insertion hole 4A2 (see, FIG. 8) formed in the foot portion 4A1. As a result, the boom 4A is connected between the mounting brackets 5B1, 5C1 of the vertical plates 5B, 5C. Here, the connecting pin 4C can be removed by drawing it out toward the right side which is opposite in the left-right direction to a cab 10 which will be described later and can be also inserted thereinto from the right side.

Figure 2:
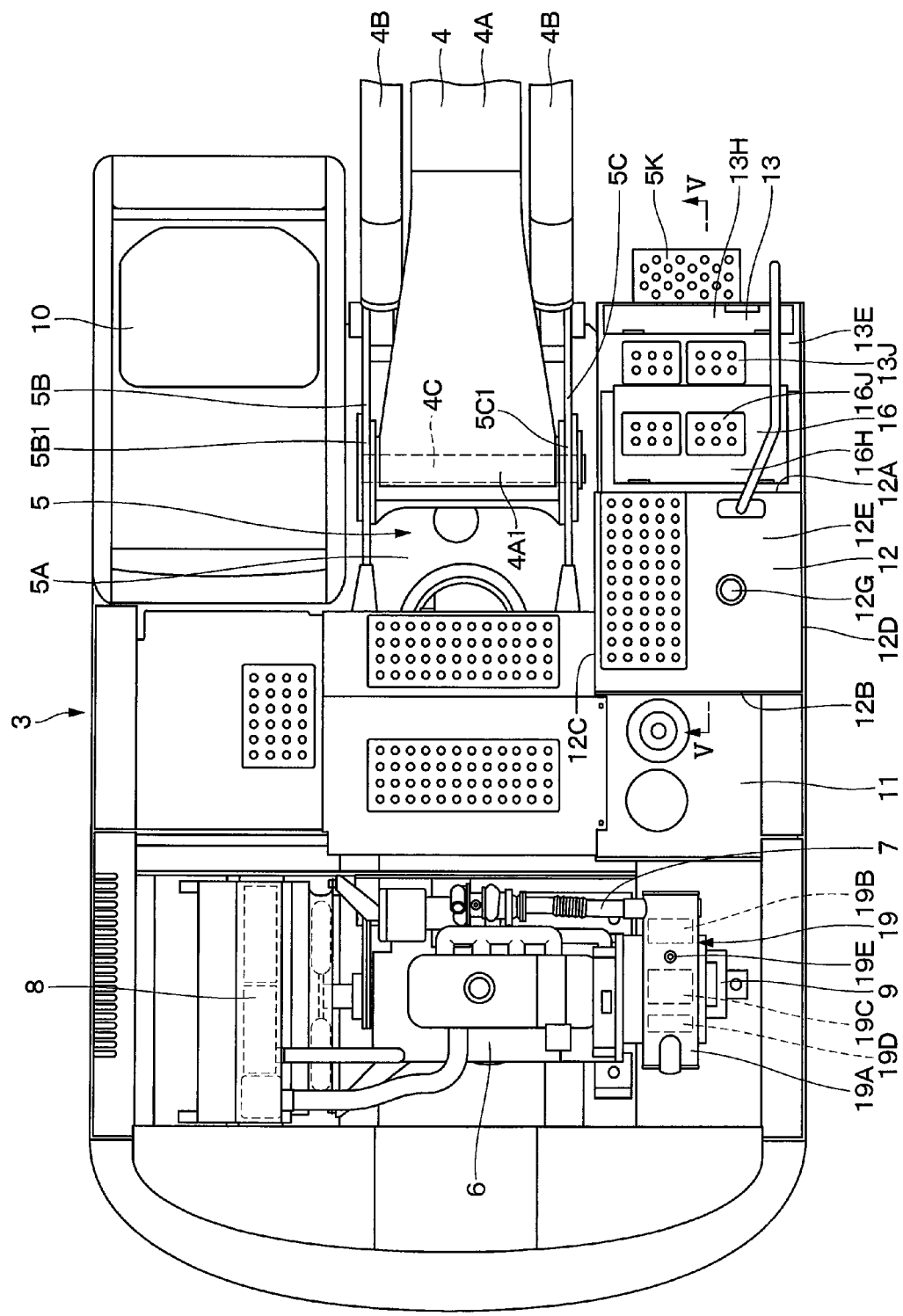
FIG. 2 is a plan view showing an upper revolving structure and the like in a state that part of a building cover has been omitted.

As shown in FIG. 2, the upper revolving structure 3 is configured by including the revolving frame 5, an engine 6, the cab 10, a hydraulic oil tank 11, a fuel tank 12, a first accommodating case 13, a second accommodating case 16, an exhaust gas purifying device 19, and a reducing agent tank 20, which will be described later.

Figure 3:
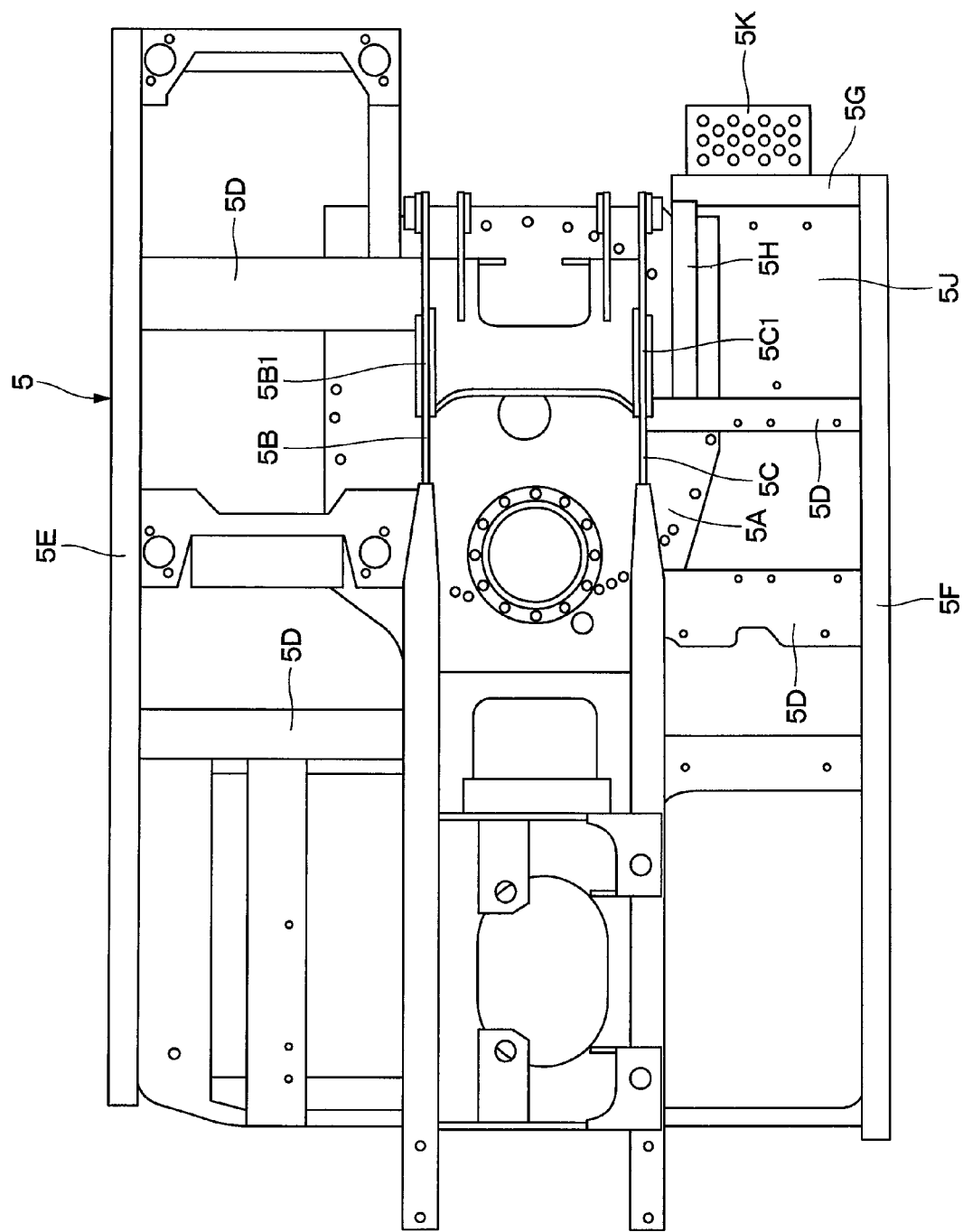
FIG. 3 is a plan view showing a revolving frame alone.

As shown in FIG. 3, the revolving frame 5 is configured by a thick bottom plate 5A which extends in a front-rear direction, the left vertical plate 5B and right vertical plate 5C which are erected on the bottom plate 5A and extend in the front-rear direction by leaving a predetermined space in the left-right direction, a plurality of extension beams 5D which extend from the aforementioned bottom plate 5A and the respective vertical plates 5B, 5C outward in the left-right direction and are arranged by leaving spaces in the front-rear direction, and left side frame 5E and right side frame 5F which are located on the outer sides in the left-right direction, mounted to distal ends of the respective extension beams 5D, and extend in the front-rear direction, and the revolving frame 5 forms a supporting structure of the upper revolving structure 3.

On the other hand, a front side beam 5G which extends toward the bottom plate 5A is provided on a front end of the right side frame 5F. On the other hand, an inner side beam 5H is provided on the bottom plate 5A so as to extend in the front-rear direction, located on the right side of the right vertical plate 5C, and a left end of the front side beam 5G is connected with a front end of the inner side beam 5H. Here, the extension beam 5D which is located on the front-most side, a front part of the right side frame 5F, the front side beam 5G and the inner side beam 5H constitute a support stand for supporting the periphery of the first accommodating case 13 which will be described later. An under cover 5J (see, FIG. 5) is provided in the inside surrounded by these extension beams 5D, the front part of the right side frame 5F, the front side beam 5G and the inner side beam 5H, located on the bottom side. Further, a footstep plate 5K is provided on a front part of the front side beam 5G so as to protrude forward, and the footstep plate 5K configures a first step on which foot is put first when getting on the upper revolving structure 3.

Figure 4:
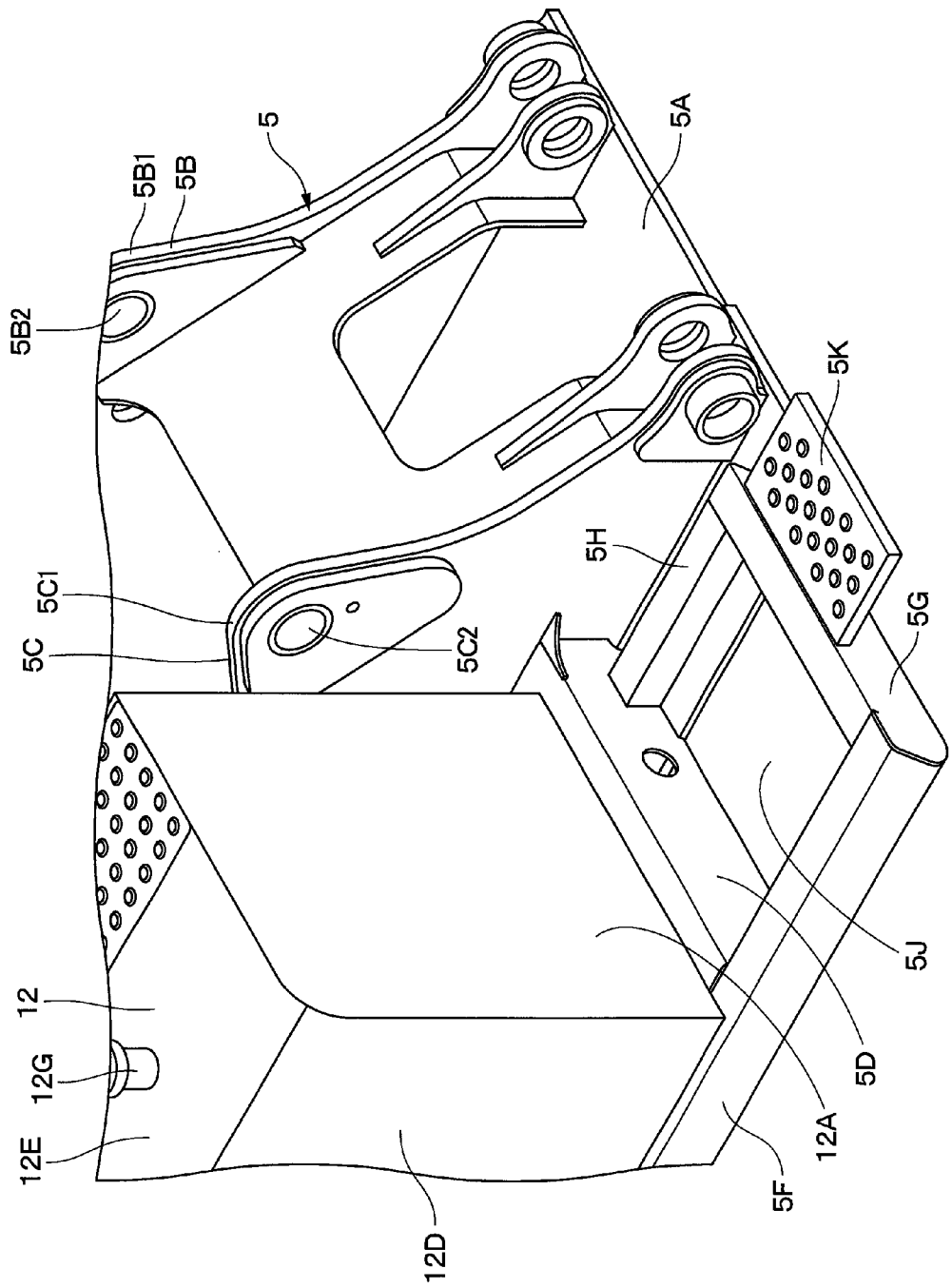
FIG. 4 is an enlarged perspective view of an essential part showing the front side of the revolving frame and part of a fuel tank.
Figure 8:
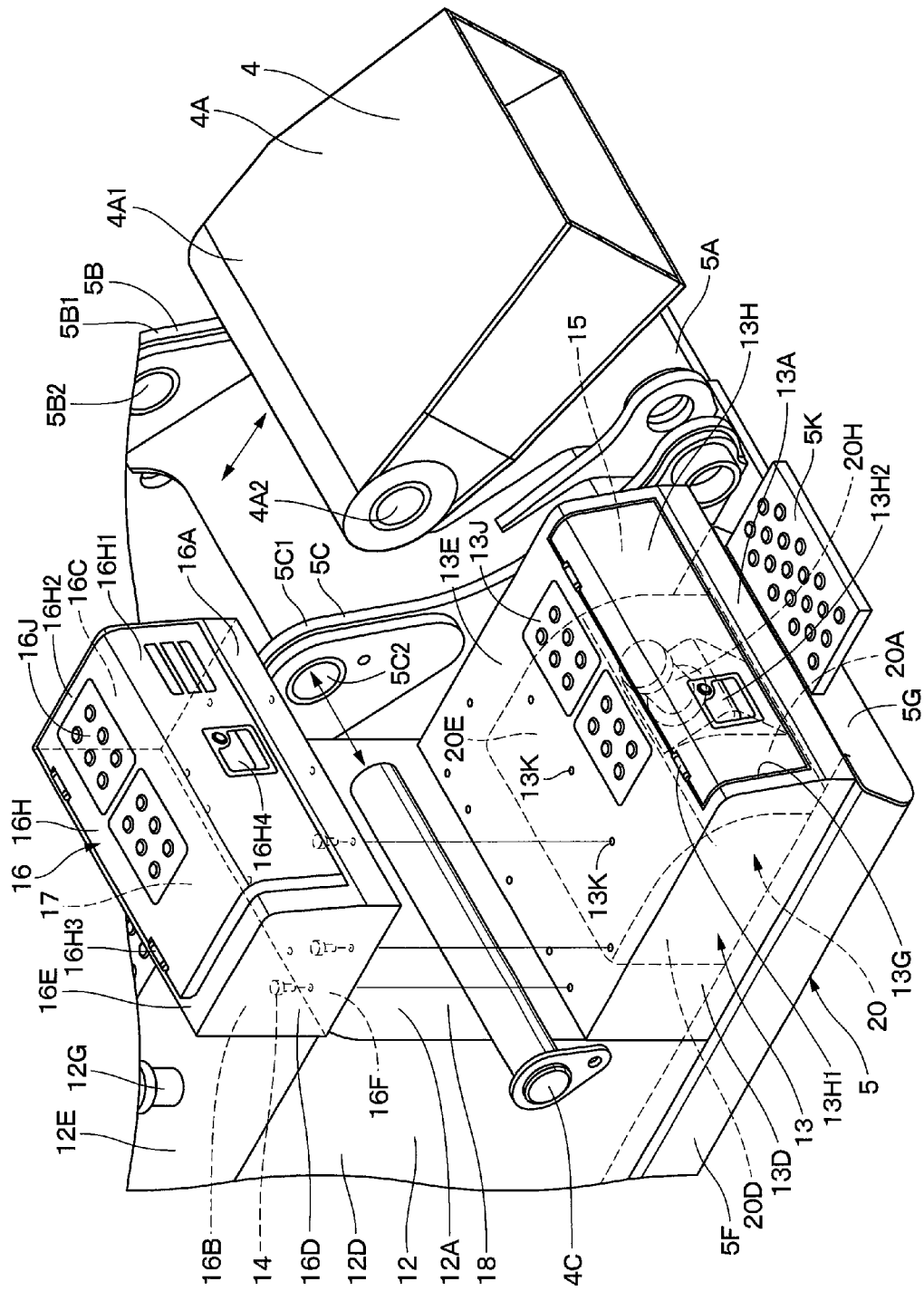
FIG. 8 is an enlarged and exploded perspective view of an essential part when a state that an inserting/removing space for a connecting pin has been formed by removing the second accommodating case has been viewed from the same position as that in FIG. 6.

Here, front side positions of the left and right vertical plates 5B, 5C constitute the mounding brackets 5B1, 5C1 for mounting the foot portion 4A1 of the boom 4A which configures the working mechanism 4. As shown in FIG. 4, the pin insertion holes 5B2, 5C2 are formed in upper parts of the mounting brackets 5B1, 5C1 so as to be coaxial in the left-right direction, and the connecting pin 4C of the working mechanism 4 is inserted into the respective pin insertion holes 5B2, 5C2 as shown in FIG. 8.

As shown in FIG. 2, the engine 6 is provided on the rear side of the revolving frame 5, and the engine is configured as a diesel engine and is loaded on the revolving frame 5 in a transversely mounted state, for example. This engine 6 is provided with an exhaust pipe 7 for emitting exhaust gas.

Although the diesel engine 6 is highly efficient and excellent in durability, harmful substances such as particulate matters (PM), nitrogen oxides (NOx) and the like are emitted together with the exhaust gas. Therefore, the exhaust gas purifying device 19 which will be described later is mounted to the exhaust pipe 7.

A heat exchanger 8 is provided on the left side of the engine 6, and the heat exchanger 8 is configured by including a radiator for cooling engine cooling water, an oil cooler for cooling hydraulic oil, and an intercooler for cooling air that the engine 6 sucks in. On the other hand, a hydraulic pump 9 is located on the lower side of the exhaust gas purifying device 19 and is mounted to the right side of the engine 6, and the hydraulic pump 9 is adapted to deliver the hydraulic oil from the hydraulic oil tank 11 as pressurized oil by being driven by the engine 6.

The cab 10 is provided on the left front side of the revolving frame 5 with the working mechanism 4 interposed. This cab 10 is the one on which an operator gets in order to operate the hydraulic excavator 1. An operator's seat on which the operator sits, levers used for performing various operations, pedals and the like (none of them is shown) are installed in the cab 10.

Indicated at 11 is the hydraulic oil tank as an oil storage tank which is located on the front side of the engine 6 and provided at a right-side position of the revolving frame 5. This hydraulic oil tank 11 is adapted to store the hydraulic oil therein and is formed as a parallelepiped pressure resistance tank which extends in a vertical direction.

Indicated at 12 is the fuel tank as an oil storage tank which is provided at a right-side position of the revolving frame 5 so as to be adjacent to the front side of the hydraulic oil tank 11. A later described front surface plate 12A which configures a front end of this fuel tank 12 is installed at a position which is more rearward than the mounting brackets 5B1, 5C1 of the respective vertical plates 5B, 5C of the revolving frame 5 and at a right-side position of the right vertical plate 5C. In more detail, the front surface plate 12A of the fuel tank 12 is arranged more rearward than the pin insertion holes 5B2, 5C2 formed in the mounting brackets 5B1, 5C1 so as not to be obstructive when inserting/removing the connecting pin 4C of the working mechanism 4.

The fuel tank 12 is adapted to store the fuel therein and is formed as a parallelepiped tank by the front surface plate 12A, a rear surface plate 12B, a left surface plate 12C, a right surface plate 12D, an upper surface plate 12E, and a lower surface plate 12F. The upper surface plate 12E is provided with a fuel filling opening 12G through which the fuel is filled so as to project upward.

Here, in a case where work is performed by getting on the upper side of the upper revolving structure 3, for example, in a case where the fuel is filled in the fuel tank 12, the operator needs to get on the upper surface plate 12E of the fuel tank 12. When getting on the upper surface plate 12E, he or she can readily get on and off by using an upper surface 13E of the first accommodating case 13, and an upper cover portion 16H2 of a second cover 16H of the second accommodating case 16 as a stairway (steps), which will be described later.

Next, the configurations of the first accommodating case 13 and the second accommodating case 16 which are provided on a right front part of the revolving frame 5 will be described. The first accommodating case 13 and the second accommodating case 16 are arranged one upon another in the vertical direction such that the first accommodating case 13 is located on the lower side and the second accommodating case 16 is located on the upper side.

Figure 5:
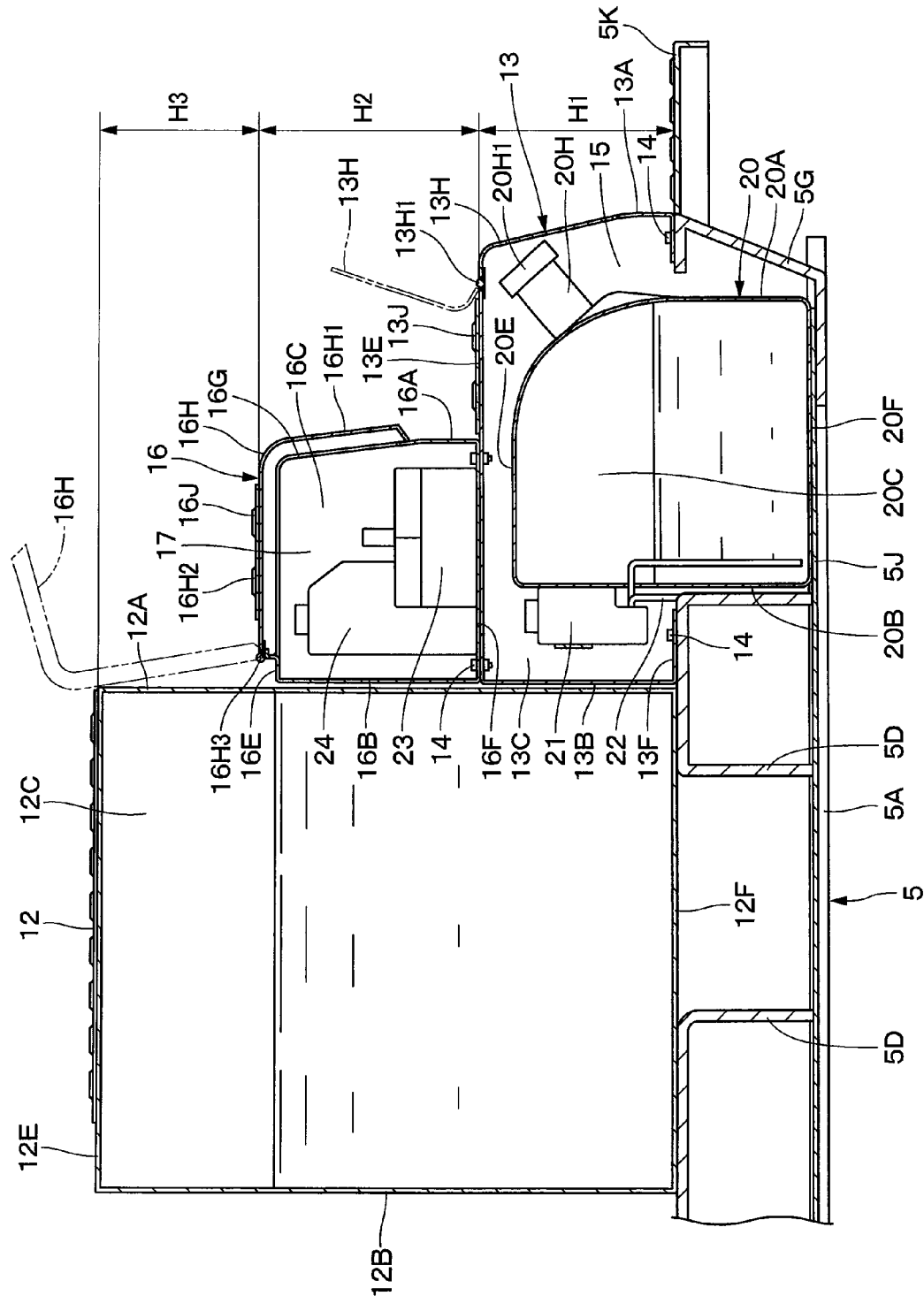
FIG. 5 is an enlarged perspective view of an essential part when the revolving frame, the fuel tank, a first accommodating case, a second accommodating case and a reducing agent tank have been viewed from a V-V direction shown by an arrow in FIG. 2.

Designated at 13 is the first accommodating case located on the right side of the revolving frame 5 with the working mechanism 4 interposed and is provided more forward than the fuel tank 12. More specifically, this first accommodating case 13 is provided on a right front end of the revolving frame 5. As shown in FIG. 3 and FIG. 5, the first accommodating case 13 is provided on the support stand surrounded by the front-most side extension beam 5D, the front part of the right side frame 5F, the front side beam 5G and the inner side beam 5H of the revolving frame 5. Incidentally, the lower side of the first accommodating case 13 is covered with the under cover 5J and defines a tank accommodating space 15 having a large volume by utilizing the under cover 5J.

Figure 6:
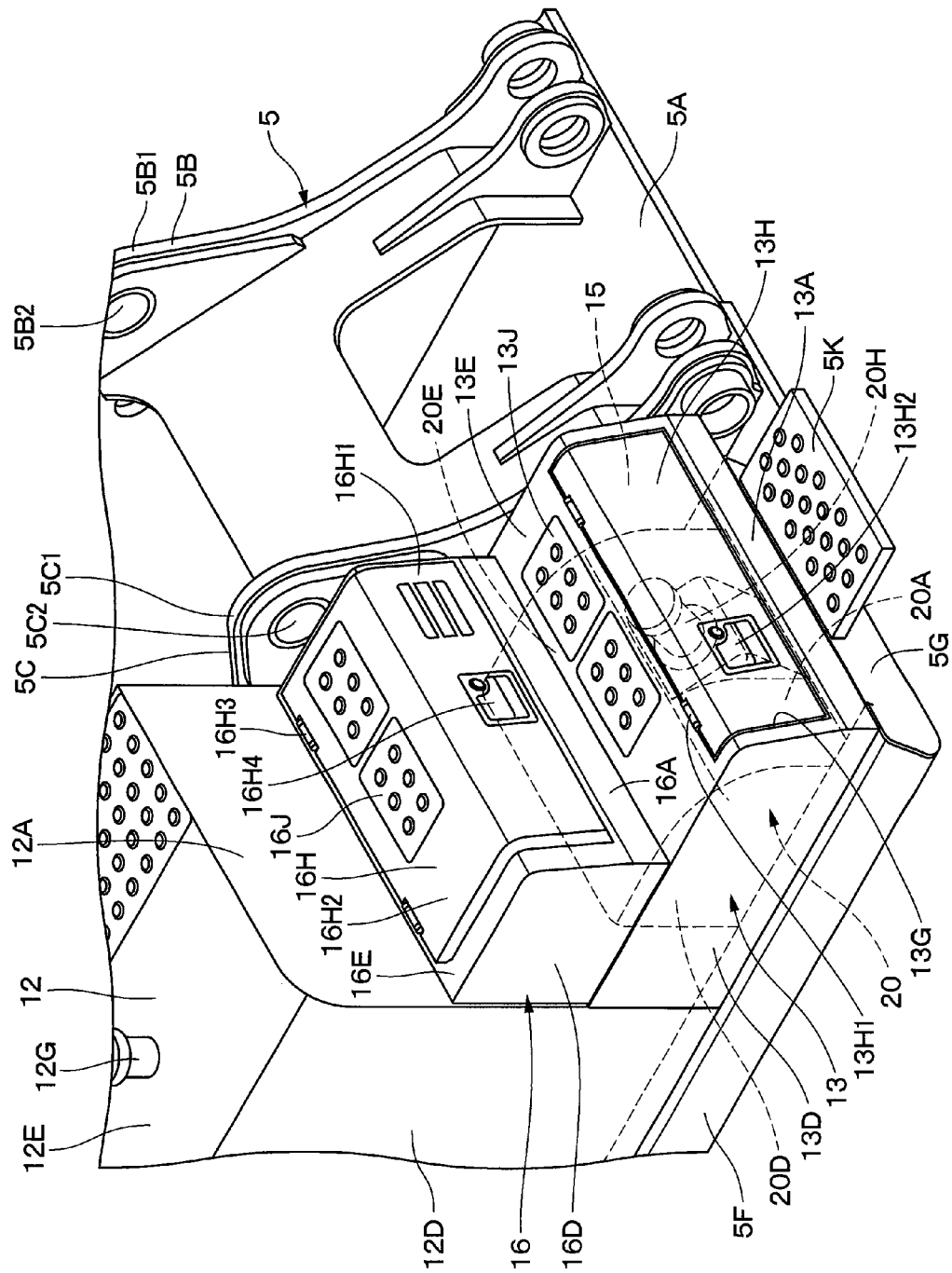
FIG. 6 is an enlarged perspective view of an essential part when the revolving frame, the fuel tank, the first accommodating case, the second accommodating case and the reducing agent tank have been viewed from the same position as that in FIG. 4.

The first accommodating cover 13 is formed as a parallelepiped container which is flat in the vertical direction, setting, for example, from the front surface plate 12A of the fuel tank 12 to a front end of the front side beam 5G of the revolving frame 5 as a length dimension in the front-rear direction and having a width dimension equal to the width dimension of the fuel tank 12. That is, as shown in FIG. 5 and FIG. 6, the first accommodating case 13 is configured by a front surface 13A formed by rising up from a front end of the front side beam 5G of the revolving frame 5, a rear surface 13B erected at a position close to the front surface plate 12A of the fuel tank 12, a left surface 13C which connects a left end part of the front surface 13A and a left end part of the rear surface 13B, a right surface 13D which connects a right end part of the front surface 13A and a right end part of the rear surface 13B, the almost square upper surface 13E which covers the upper sides of the respective surfaces 13A to 13D, and a lower surface 13F provided on lower ends of the respective surfaces 13A to 13D. Here, the aforementioned lower surface 13F is formed as a square-framed plate body and a central part of which is largely open. As a result, the first accommodating case 13 is formed as a bottomless structure and defines the large tank accommodating space 15 in cooperation with the under cover 5J of the lower-side revolving frame 5.

The front surface 13A is formed as an inclined surface which is slightly inclined rearward toward the upper side and a range from the front surface 13A to a front part of the upper surface 13E defines a wide opening 13G. This opening 13G is provided at a position corresponding to a water supply port 20H in the reducing agent tank 20 which will be described later. A first cover 13H is provided on the front side of the first accommodating case 13 at a position where it closes the opening 13G, and the cover 13H is mounted to a front-side area of the upper surface 13E via a hinge 13H1 to be openable/closable (rotatable) so as to open/close using a corner between the front surface 13A and the upper surface 13E as a fulcrum. Further, the first cover 13H is provided with a lock device 13H2 having a locking function and it can be thereby locked in a state that the cover 13H is closed and mischief and the like can be prevented in advance.

Here, as shown in FIG. 5, the first accommodating case 13 is made low in height position of its upper surface 13E. Specifically, the upper surface 13E is arranged on the upper side by a height dimension H1 from the footstep plate 5K which forms a first step on which foot is first put when getting on the upper revolving structure 3. As a result, the upper surface 13E forms a low-stage second step following the footstep plate 5K.

Further, a slip-preventing plate 13J is provided on the upper surface 13E of the first accommodating case 13 as a slip-preventing member for preventing slip of shoes. As the slip-preventing plate 13J, for example, the one provided with a cylindrical projection which projects upward from the plate material is exemplified. On the other hand, as the slip-preventing plate 13J, the one provided with a linear projection which projects upward from the plate material may be applied. That is, the slip-preventing plate 13J may have a form other than the above as long as it has a function of preventing slip of shoes.

The height dimension H1 of the first accommodating case 13 is set to a height dimension with which it is not obstructive when inserting/removing the connecting pin 4C of the working mechanism 4 while securing a height dimension with which it functions as the stairway, that is, to a dimension with which the upper surface 13E is located lower than the pin insertion holes 5B2, 5C2 formed in the mounting brackets 5B1, 5C1 of the respective vertical plates 5B, 5C. Here, the height dimension H1 of the first accommodating case 13 is determined on the basis of the upper surface of the revolving frame 5, that is, the upper surfaces of the extension beams 5D, the front side beam 5G, the inner side beam 5H, the footstep plate 5K and the like.

In the first accommodating case 13, the lower surface 13F thereof is mounted to the extension beams 5D, the front side beam 5G and the like of the revolving frame 5 by using a plurality of bolts 14. Further, in the first accommodating case 13, the second accommodating case 16 which will be described later can be mounted to the rear side of the upper surface 13E so as to be mountable/demountable. For this purpose, as shown in FIG. 8, a plurality of female screw holes 13K are formed in a part closer to the rear side of the upper surface 13E.

The tank accommodating space 15 is defined in the first accommodating case 13. This tank accommodating space 15 is formed as a space between the upper surface 13E of the first accommodating case 13 and the under cover 5J of the revolving frame 5. Specifically, the first accommodating case 13 is arranged on the upper sides of the extension beams 5D, the front side beam 5G, the inner side beam 5H and the like in a state that the central part of the lower surface 13F is largely open. As a result, the tank accommodating space 15 is formed by adding an accommodating space of the amount corresponding to height dimensions of the respective beams 5D, 5G, 5H to the accommodating space in the first accommodating case 13. Thus, the accommodating space in the tank accommodating space 15 can be expanded down to the position of the under cover 5J and the reducing agent tank 20 which will be described later can be accommodated therein by forming the first accommodating case 13 as the bottomless structure as described above.

Designated at 16 is the second accommodating case provided on the rear side of the upper surface 13E of the first accommodating case 13. The second accommodating case 16 secures a region for putting foot on the upper surface 13E of the first accommodating case 13 by setting its length dimension in the front-rear direction to about a half of the length dimension in the front-rear direction of the first accommodating case 13, for example. The width dimension of the second accommodating case 16 is set equally to that of the first accommodating case 13. The second accommodating case 16 is mounted onto the upper surface 13E of the first accommodating case 13 and the article accommodating space 17 which will be described later is defined therein.

The second accommodating case 16 is configured as a horizontally long square cylindrical container by a front surface 16A, a rear surface 16B, a left surface 16C, a right surface 16D, an upper surface 16E, and a lower surface 16F. The front surface 16A is formed as an inclined surface which is slightly inclined rearward toward the upper side and a wide range from the front surface 16A to the rear side of the upper surface 16E defines an opening 16G. A tool box 23 and the like which will be described later can be readily put into/out of an article accommodating space 17 by providing this opening 16G in the majority of the front surface 16A and the upper surface 16E.

The second cover 16H is provided ranging from the front side to the upper side of the second accommodating case 16 at a position where it closes the opening 16G. A plate body which is bent into an L-shape is used as the second cover 16H, and the cover 16H is formed by a front cover portion 16H1 which faces the front surface 16A when closed, and the upper cover portion 16H2 which faces the upper surface 16E and constitutes one part of the upper surface 16E. The upper cover portion 16H2 is mounted to a rear part of the upper surface 16E to be openable/closable (rotatable) via a hinge 16H3 such that the second cover 16H is opened/closed by using the rear side of the upper surface 16E as a fulcrum. Further, the front cover portion 16H1 of the second cover 16H is provided with the lock device 16H4 having the locking function, and therefore it can be locked in a state that the cover 16H is closed and mischief and the like can be prevented in advance.

Here, the second accommodating case 16 is made so as to put foot on the upper cover portion 16H2 of the second cover 16H when getting on/off the upper revolving structure 3 and this cover 16H is formed by having a sufficient strength. Here, the upper surface when getting on the second accommodating case 16 is formed as the upper cover portion 16H2 of the second cover 16H. Therefore, the position of the upper surface 16E (that is, the upper cover portion 16H2) of the second accommodating case 16 is set to a position which is higher than the upper surface 13E of the first accommodating case 13 by a height dimension H2 and is lower than the upper surface plate 12E of the fuel tank 12 by a height dimension H3. As a result, the upper cover portion 16H2 of the second cover 16H forms a high-stage third step following the upper surface 13E of the first accommodating case 13. This upper cover portion 16H2 is provided with a slip-preventing plate 16J as a slip-preventing member for preventing slip of shoes.

The article accommodating space 17 is defined in the second accommodating case 16. This article accommodating space 17 is adapted to accommodate the tool box 23, a spare urea water bottle 24, various consumption articles (not shown) and the like which will be described later.

The second accommodating case 16 the inside of which is defined as the article accommodating space 17 is mounted to the upper surface 13E to be mountable/demountable by screwing the plurality of bolts 14 which have been inserted into its lower surface 16F into the female screw holes 13K in the first accommodating case 13.

On the other hand, as shown in FIG. 8, since the first accommodating case 13 is located lower than the pin insertion holes 5B2, 5C2 in the respective vertical plates 5B, 5C in a state that the second accommodating case 16 has been demounted from the first accommodating case 13, an inserting/removing space 18 can be formed on this first accommodating case 13. In a state that this inserting/removing space 18 is provided, the connecting pin 4C which connects the foot portion 4A1 of the boom 4A of the working mechanism 4 to the mounting brackets 5B1, 5C1 of the respective vertical plates 5B, 5C of the revolving frame 5 can be inserted/removed. Therefore, the working mechanism 4 can be mounted/demounted to/from the upper revolving structure 3 by inserting/removing the connecting pin 4C.

Indicated at 19 is the exhaust gas purifying device provided for the exhaust pipe 7 of the engine 6. This exhaust gas purifying device 19 is adapted to trap and remove by burning the particulate matters (PM) in the exhaust gas and purify the nitrogen oxides (NOx) in the exhaust gas by using an urea water solution (hereinafter, referred to as urea water) serving as a reducing agent. As shown in FIG. 2, the exhaust gas purifying device 19 is configured by an accommodating tubular casing 19A which is connected to the exhaust pipe 7, a particulate matter removing filter 19B which is accommodated on the upstream side in the accommodating tubular casing 19A to trap and remove by burning the particulate matters (PM), an urea selective reduction catalyst 19C which is arranged on the downstream side of the particulate matter removing filter 19B, an oxidation catalyst 19D which is arranged on the downstream side of the urea selective reduction catalyst 19C, and an urea water injection valve 19E which is provided on the upstream side of the urea selective reduction catalyst 19C. The urea water injection valve 19E is connected to the reducing agent tank 20 via reducing agent supply pump 21 and reducing agent supply line 22 which will be described later.

Here, the exhaust gas purifying device 19 traps and removes by burning the particulate matters (PM) contained in the exhaust gas by the particulate matter removing filter 19B. Further, the exhaust gas purifying device 19 injects the urea water into the exhaust gas by the urea water injection valve 19E, makes the exhaust gas undergo reduction reaction by using ammonium generated from the urea water with the urea selective reduction catalyst 19C and decomposes the exhaust gas into water and nitrogen. Then, ammonium in the exhaust gas is reduced by the oxidation catalyst 19D.

Indicated at 20 is a reducing agent tank which is accommodated in the tank accommodating space 15 in the first accommodating case 13. This reducing agent tank 20 is adapted to store the urea water to be supplied into the exhaust gas flowing through the upstream side of the urea selective reduction catalyst 19C of the exhaust gas purifying device 19. The reducing agent tank 20 is mounted onto the under cover 5J of the revolving frame 5, for example, so as to fit in the tank accommodating space 15 in the first accommodating case 13.

Figure 7:
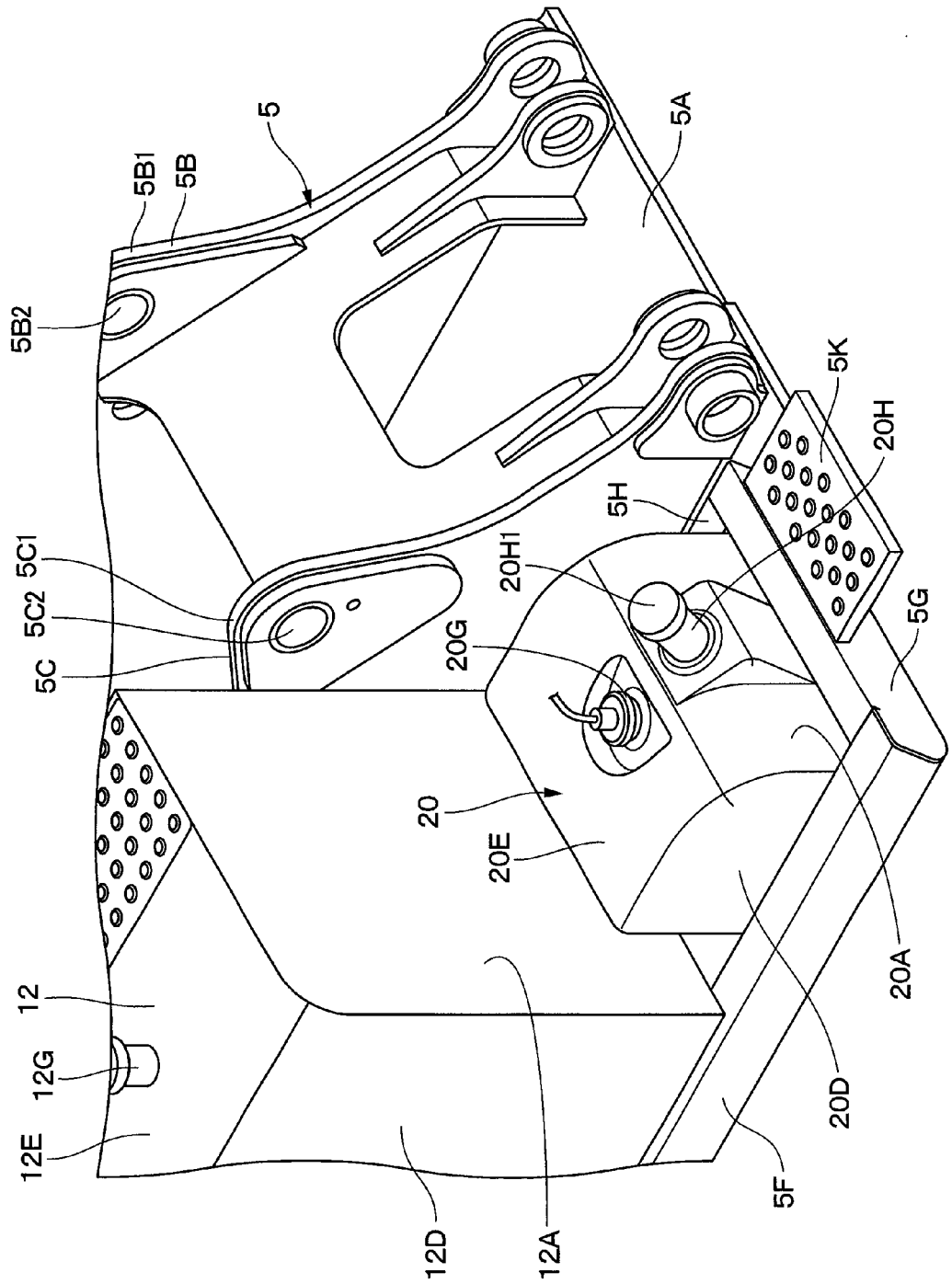
FIG. 7 is an enlarged perspective view of an essential part when the revolving frame, the fuel tank and the reducing agent tank have been viewed from the same position as that in FIG. 6 by removing the first and second accommodating cases.

Specifically, the reducing agent tank 20 is formed as a box-shaped structure having a height dimension with which it fits in the tank accommodating space 15. The reducing agent tank 20 is constituted of a front surface 20A, a rear surface 20B, a left surface 20C, a right surface 20D, an upper surface 20E and a lower surface 20F. As shown in FIG. 7, the upper surface 20E is provided with a sensor connecting portion 20G to which sensors (not shown) such as a temperature sensor, a liquid level sensor (a level gauge) and the like are connected.

Further, a water supply port 20H for supplying the urea water is provided in an upper part position of the front surface 20A. This water supply port 20H is provided to be open forward or upward, specifically, diagonally upward. As a result, the urea water can be readily replenished from the front side or the upper side by removing a cap 20H1 in a state that the cover 13H of the first accommodating case 13 is opened. Incidentally, although in the embodiment, the water supply port 20H has been diagonally arranged, it may be configured to be open forward or upward.

Here, since the reducing agent tank 20 according to the first embodiment can be singly accommodated in the large tank accommodating space 15 between the upper surface 13E of the first accommodating case 13 and the under cover 5J of the revolving frame 5, the reducing agent tank 20 has a sufficient capacity allowing storage of the urea water of the amount needed for a long-term operation.

As shown in FIG. 5, the reducing agent supply pump 21 is located in the tank accommodating space 15 and mounted on the rear surface 20B of the reducing agent tank 20. Specifically, the reducing agent supply pump 21 is arranged between the rear surface 20B of the reducing agent tank 20 and the rear surface 13B of the first accommodating case 13. The reducing agent supply pump 21 is adapted to supply the urea water in the reducing agent tank 20 toward the urea water injection valve 19E of the exhaust gas purifying device 19 via the reducing agent supply line 22. In this case, it is arranged utilizing a space (a dead space) between this rear surface 20B and the rear surface 13B of the first accommodating case 13, by mounting the reducing agent supply pump 21 on the rear surface 20B of the reducing agent tank 20 as described above. Enlargement of the reducing agent tank 20 is promoted also by arranging it in this way.

Incidentally, indicated at 23 is the tool box accommodated in the article accommodating space 17 of the second accommodating case 16, likewise, indicated at 24 is the spare urea water bottle accommodated in the article accommodating space 17 respectively, and these tool box 23 and urea water bottle 24 configure the articles to be accommodated in the article accommodating space 17. In the tool box 23, a spanner, a driver, a grease gun and the like (none of them is shown) used for maintenance are accommodated.

The hydraulic excavator 1 according to the first embodiment has the configuration as mentioned above and next, the operation thereof will be described.

The operator who has gotten on the cab 10 drives the hydraulic pump 9 by starting the engine 6. He can move the lower traveling structure 2 forward or rearward by controlling the levers and the like for traveling in this state. On the other hand, he can perform the excavating work of earth and sand and the like by moving the working mechanism 4 upward and downward by controlling the lever for work.

When operating the engine 6, the particulate matters (PM) and nitrogen oxides (NOx) which are harmful substances are emitted from the exhaust pipe 7 thereof. At that time, the particulate matter removing filter 19B of the exhaust gas purifying device 19 traps and removes by burning the particulate matters (PM) contained in the exhaust gas. Further, the exhaust gas purifying device 19 supplies the urea water solution stored in the reducing agent tank 20 to the urea water injection valve 19E through the reducing agent supply line 22 by using the reducing agent supply pump 21. At that time, the urea water solution is injected from the urea water injection valve 19E into the exhaust gas to generate ammonium. Therefore, in the urea selective reduction catalyst 19C, the nitrogen oxides are reduced to water and nitrogen and they are discharged to the outside through the oxidation catalyst 19D. As a result, the exhaust gas purifying device 19 can reduce emission amounts of the particulate matters and the nitrogen oxides.

On the other hand, in a case where the urea water is to be replenished into the reducing agent tank 20, a lock device 16H4 provided on the cover 16H of the second accommodating case 16 is unlocked to open the cover 16H upward as shown by a two-point chain line in FIG. 5. In this state, the urea water bottle 24 accommodated in the article accommodating space 17 is taken out. After the urea water bottle 24 has been taken out as mentioned above, the lock device 13H2 provided on the cover 13H of the first accommodating case 13 is unlocked to open the cover 13H upward as shown by a two-dot chain line in FIG. 5. In this state, the urea water can be readily replenished through the water supply port 20H by demounting the cap 20H1 mounted on the water supply port 20H of the reducing agent tank 20.

In a case where fuel is to be replenished into the fuel tank 12, foot is put on the footstep plate 5K of the revolving frame 5 from the lower traveling structure 2 and then foot is sequentially stepped on the upper surface 13E of the first accommodating case 13 and on the upper cover portion 16H2 of the second cover 16H provided on the second accommodating case 16, thereby getting on the upper surface plate 12E of the fuel tank 12. At that time, since the slip-preventing plates 13J and 16J are provided on the upper surface 13E of the first accommodating case 13 and the upper cover portion 16H2 of the second cover 16H respectively, slip when foot has been put on them can be avoided. The fuel can be replenished into the fuel tank 12 through the fuel filling opening 12G by getting on the upper surface plate 12E of the fuel tank 12.

Further, a case where the boom 4A of the working mechanism 4 is to be demounted from the revolving frame 5 will be described. In this case, first, the working mechanism 4 is placed on the ground and the boom 4A is suspended by a crane (not shown). Next, after the tool box 23 and the like accommodated in the second accommodating case 16 have been taken out, each bolt 14 is loosed and removed to demount the second accommodating case 16 from the first accommodating case 13, thereby securing the inserting/removing space 18 on the right side of the right vertical plate 5C. In this state, the pin insertion hole 4A2 and the foot portion 4A1 of the boom 4A are arranged between the mounting brackets 5B1, 5C1 of the left and right vertical plates 5B, 5C of the later described revolving frame 5 and the connecting pin 4C which is inserted into the pin insertion holes 5B2, 5C2 in the respective vertical plates 5B, 5C is drawn out toward the inserting/removing space 18 side (the right side). By this procedure, the boom 4A can be demounted from the left and right vertical plates 5B, 5C. The boom 4A can be mounted to the left and right vertical plates 5B, 5C by reversely performing this procedure.

Thus, according to the first embodiment, the first accommodating case 13 which is located on the right front part of the revolving frame 5 which is more forward than the fuel tank 12 and the height dimension of the upper surface 13E of which has been set to the small dimension H1 is provided, and the second accommodating case 16 is provided so as to superpose on the rear side of the upper surface 13E of this first accommodating case 13. As a result, the second accommodating case 16 can be arranged at a position where the position of the upper cover portion 16H2 of the second cover 16H is higher than the upper surface 13E of the first accommodating case 13 by the height dimension H2 and is lower than the upper surface plate 12E of the fuel tank 12 by the height dimension H3. In this state, the reducing agent tank 20 for storing the urea water is provided in the tank accommodating space 15 in the first accommodating case 13 and the articles such as the tool box 23, the urea water bottle 24 and the like are accommodated in the article accommodating space 17 in the second accommodating case 16.

As described above, in the first embodiment, since the first accommodating case 13 and the second accommodating case 16 are provided independently, only the reducing agent tank 20 can be accommodated in the tank accommodating space 15 in the first accommodating case 13.

As a result, in a case where the urea water is to be replenished into the reducing agent tank 20, the urea water can be readily replenished into the reducing agent tank 20 without being obstructed by the articles such as the tool box 23 and the like. In addition, since the first accommodating case 13 is provided as the special case for accommodating the reducing agent tank 20, the tank accommodating space 15 in the first accommodating case 13 can be increased and as a result of which the reducing agent tank 20 can be formed to have a large capacity. Therefore, the number of times of urea water replenishing work can be reduced and the workability can be improved.

On the other hand, the second accommodating case 16 is provided separately from the first accommodating case 13 as the special case for accommodating the tool box 23 and the like. Therefore, the tool box 23 and the like provided in the article accommodating space 17 in the second accommodating case 16 can be readily taken in/out without being obstructed by the reducing agent tank 20 and the usability can be made favorable.

Since the reducing agent tank 20 is configured to be accommodated in the first accommodating case 13, falling of rain water and snow on the reducing agent tank 20 can be avoided by the first accommodating case 13. As a result, the durability of the reducing agent tank 20 against damage and corrosion can be improved and, in addition, the urea water can be made to hardly freeze by increasing heat insulating effect.

The upper surface 13E of the first accommodating case 13 is set as a low-stage step and the upper cover portion 16H2 of the cover 16H of the second accommodating case 16 is set as a high-stage step by setting the upper surface 16E of the second accommodating case 16 higher than the upper surface 13E of the first accommodating case 13, thereby the stairway leading to the top of the fuel tank 12 can be formed. As a result, for example, in a case of getting on the fuel tank 12 for performing the fuel filling work, he or she can readily get on the fuel tank 12 by sequentially stepping foot on the footstep plate 5K of the revolving frame 5, the upper surface 13E of the first accommodating case 13 and the upper cover portion 16H2 of the cover 16H of the second accommodating case 16 as the stairway. On the other hand, he or she can also readily get off the upper revolving structure 3 by sequentially putting foot on them in reverse order.

In addition, since the slip-preventing plate 13J is provided on the upper surface 13E of the first accommodating case 13 and the slip-preventing plate 16J is provided on the upper cover portion 16H2 of the cover 16H of the second accommodating case 16, slip when putting foot on them can be prevented. As a result, safety when getting on/off the fuel tank 12, workability of the oil filling work and the like can be improved.

The second accommodating case 16 is made mountable/demountable to/from the first accommodating case 13. In a state that the second accommodating case 16 has been demounted from on the first accommodating case 13, the inserting/removing space 18 used for inserting/removing the connecting pin 4C which connects the boom 4A of the working mechanism 4 to the left and right vertical plates 5B, 5C (the mounting brackets 5B1, 5C1) of the revolving frame 5 can be secured. As a result, since the connecting pin 4C can be inserted/removed simply by demounting the second accommodating case 16, work of attaching/detaching the boom 4A to/from the mounting brackets 5B1, 5C1 of the revolving frame 5 can be readily performed.

The revolving frame 5 is provided with the under cover 5J so as to be located on the bottom side and the tank accommodating space 15 is formed as the space between the upper surface 13E of the first accommodating case 13 and the under cover 5J. Therefore, the tank accommodating space 15 can be formed by adding the accommodating space from the upper surfaces of the extension beams 5D and the like to the under cover 5J to the accommodating space in the first accommodating case 13. As a result, the large-sized reducing agent tank 20 which can store much urea water can be accommodated in the tank accommodating space 15.

The water supply port 20H is provided so as to be open diagonally upward in the reducing agent tank 20 and the first cover 13H which is openable/closable is provided on the first accommodating case 13 at a position where the first cover 13H covers the water supply port 20H in the reducing agent tank 20. Accordingly, the water supply port 20H of the reducing agent tank 20 can be exposed to the outside by opening the first cover 13H and the urea water can be replenished through the exposed water supply port 20H. At that time, since the water supply port 20H is open diagonally upward, the urea water level can be smoothly replenished from the front-side position or the upper-side position where it can be readily replenished by getting on the lower traveling structure 2.

The reducing agent supply pump 21 for supplying the urea water in the reducing agent tank 20 to the exhaust gas purifying device 19 is configured to be located between the rear surface 20B of the reducing agent tank 20 and the rear surface 13B of the first accommodating case 13 and to be mounted on the rear surface 20B of the reducing agent tank 20. Therefore, the reducing agent supply pump 21 can be provided by utilizing the dead space formed between the rear surface 20B of the reducing agent tank 20 and the rear surface 13B of the first accommodating case 13.

Further, since the cover 13H of the first accommodating case 13 is provided with the lock device 13H2 having the locking function, it can be locked by this lock device 13H2 in a state that the first cover 13H is closed. As a result, mischief and the like can be prevented in advance and the reducing agent tank 20 can be protected. Likewise, since the cover 16H of the second accommodating case 16 is also provided with the lock device 16H4 having the locking function, the tool box 23 and the like therein can be protected by this lock device 16H4.

Figure 9:
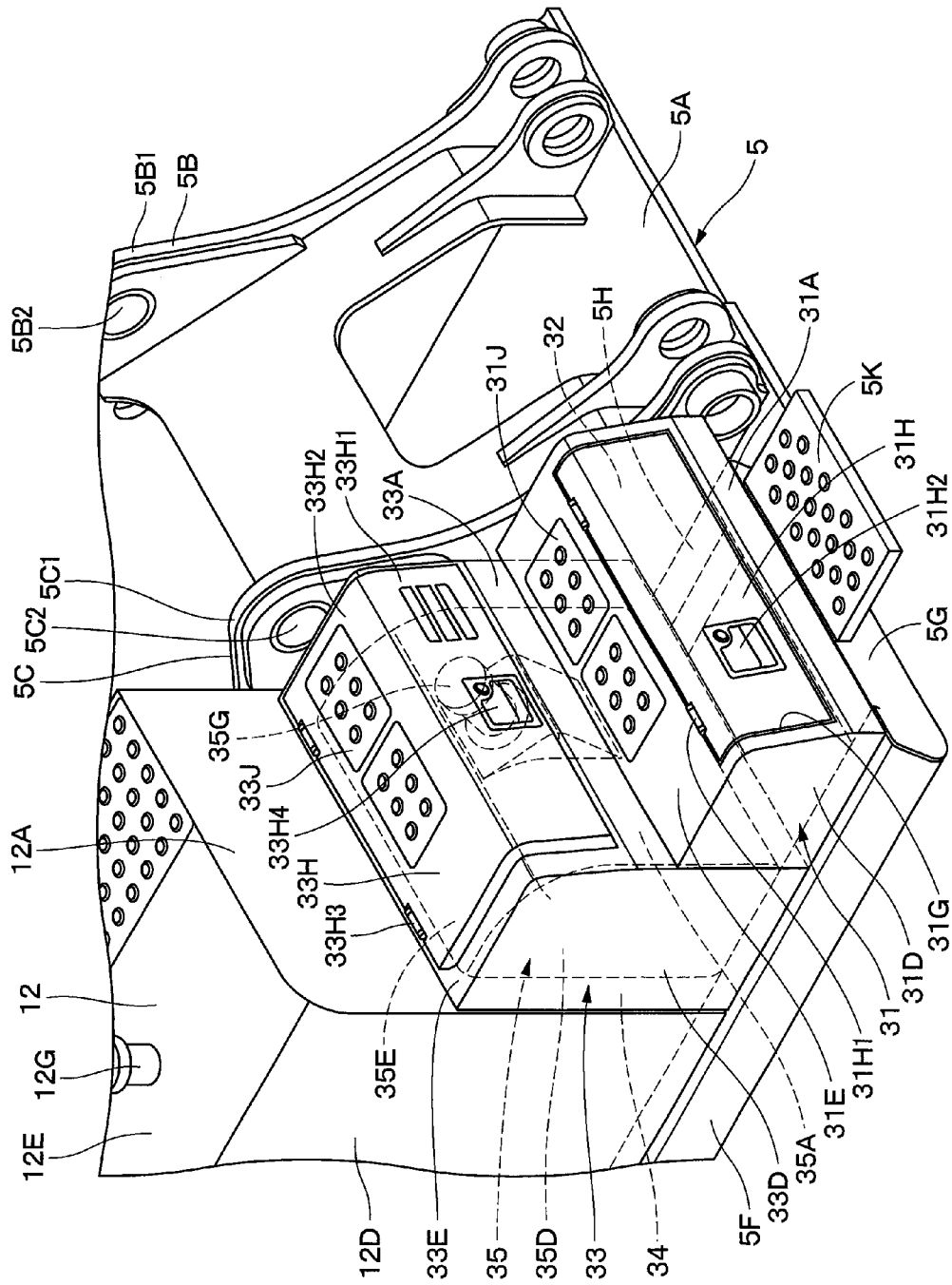
Figure 10:
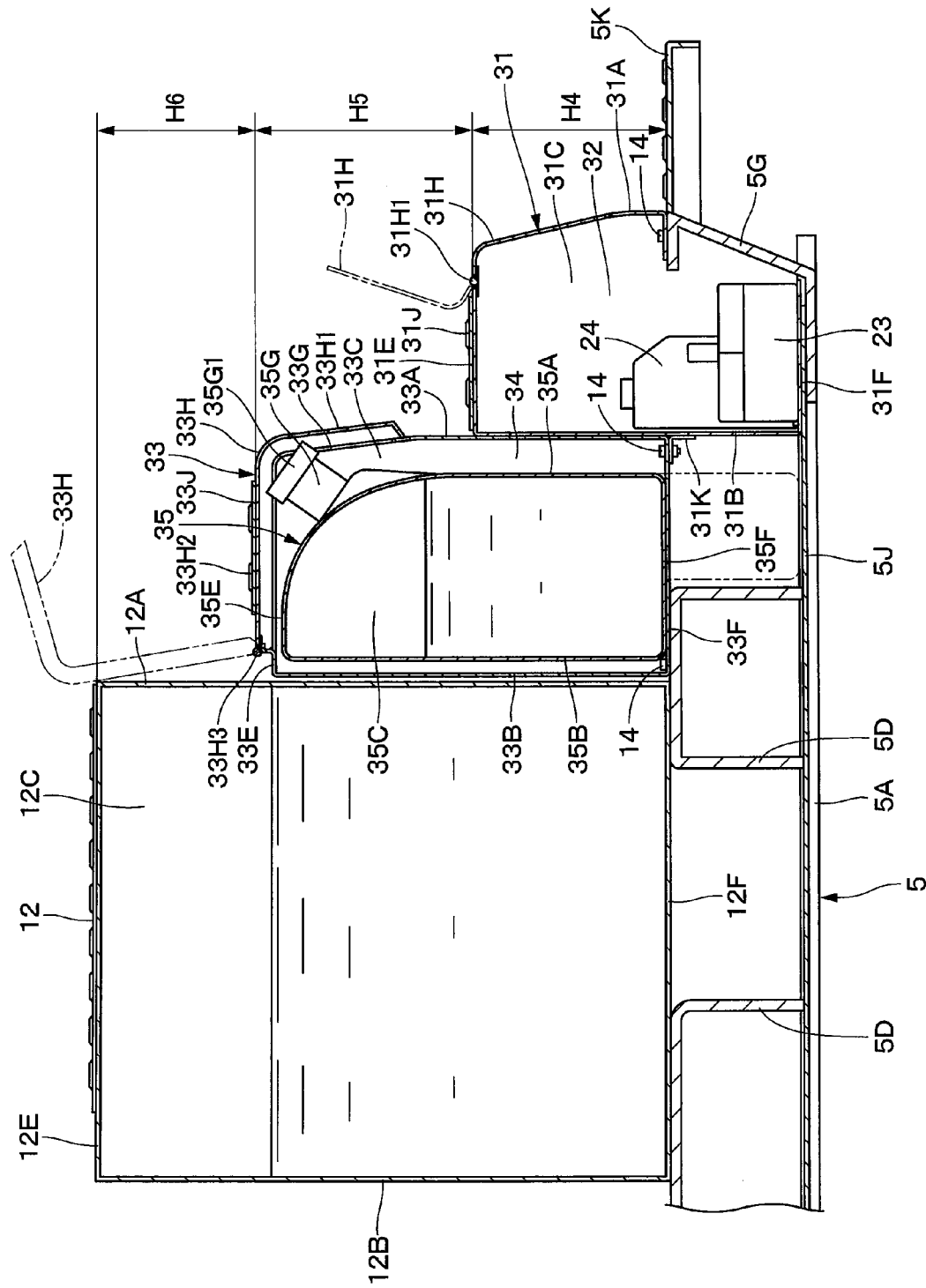
FIG. 10 is an enlarged perspective view of an essential part when the revolving frame, the fuel tank, the first accommodating case, the second accommodating case and the reducing agent tank have been viewed from the same position as that in FIG. 5.

Next, FIG. 9 and FIG. 10 show a second embodiment of the present invention. A feature of the present embodiment lies in the configuration that the first accommodating case is arranged on the front side, the second accommodating case is arranged between the rear side of the first accommodating case and the oil storage tank, and the reducing agent tank is accommodated in the tank accommodating space of the second accommodating case. Incidentally, in the second embodiment, component elements that are identical to those in the foregoing first embodiment will be simply denoted by the same reference numerals to avoid repetitions of similar explanations.

As shown in FIG. 9 and FIG. 10, designated at 31 is a first accommodating case according to the second embodiment. This first accommodating case 31 is provided on a right side end of the revolving frame 5 with the working mechanism 4 interposed almost similarly to the first accommodating case 13 according to the first embodiment. However, the first accommodating case 31 according to the second embodiment is different from the first accommodating case 13 according to the first embodiment in that it is formed as a square cylindrical container which is short-sized in the front-rear direction and extends in the left-right direction, a space for arranging a second accommodating case 33 which will be described later is formed between the first accommodating case 13 and the fuel tank 12, and the inside defines an article accommodating space 32 which will be described later.

That is, the first accommodating case 31 is configured as a horizontally long square cylindrical container, setting, for example, about a half of a length dimension from the front surface plate 12A of the fuel tank 12 to a front end of the front side beam 5G of the revolving frame 5 as a length dimension in the front-rear direction and having a width dimension equal to the width dimension of the fuel tank 12. The first accommodating case 31 is configured by a front surface 31A, a rear surface 31B, a left surface 31C, a right surface 31D, an upper surface 31E and a lower surface 31F. The lower surface 31F is arranged on the under cover 5J of the revolving frame 5, and therefore the first accommodating case 31 defines the large article accommodating space 32 by utilizing a space down to the under cover 5J of the revolving frame 5 which is located on the lower side.

A range from the front surface 31A to a front part of the upper surface 31E defines a wide opening 31G and a first cover 31H is provided at a position where it closes this opening 31G. The first cover 31H is mounted to a front-side area of the upper surface 31E to be openable/closable (rotatable) via a hinge 31H1 so as to open/close by using a corner between the front surface 31A and the upper surface 31E as a fulcrum. Further, the first cover 31H is provided with a lock device 31H2 having a locking function, and therefore it can be locked in a state that the cover 31H is closed and mischief and the like can be prevented in advance.

Here, as shown in FIG. 10, the height position of the upper surface 31E of the first accommodating case 31 is low and the first accommodating case 31 is arranged on the upper side by a height dimension H4 from the footstep plate 5K of the revolving frame 5. As a result, the upper surface 31E forms the low-stage second step following the footstep plate 5K. In addition, a slip-preventing plate 31J serving as a slip-preventing member for preventing slip of shoes is provided on this upper surface 31E. Here, the height dimension H4 of the first accommodating case 31 is determined on the basis of the upper surface of the revolving frame 5, that is, the upper surfaces of the extension beams 5D, the front side beam 5G, the inner side beam 5H, the footstep plate 5K and the like.

The first accommodating case 31 has, for example, a support bracket 31K on the rear surface 31B, and the support bracket 31K is adapted to support a front part of the second accommodating case 33. Incidentally, as a configuration for supporting the front part of the second accommodating case 33, it may be also configured that the revolving frame 5 is provided with a support stand (not shown). A lower part of the front surface 31A and the lower surface 31F of the first accommodating case 31 are mounted to the front side beam 5G, the under cover 5J and the like of the revolving frame 5 by using the plurality of bolts 14.

The article accommodating space 32 is defined in the first accommodating case 31. This article accommodating space 32 is adapted to accommodate the spare urea water bottle 24, various assumption articles and the like (not shown). Since the article accommodating space 32 is formed down to the lower surface positions of the extension beams 5D, the front side beam 5G and the inner side beam 5H of the revolving frame 5, that is, down to the position of the under cover 5J, the article accommodating space 32 can be largely formed in the vertical direction so as to accommodate many articles.

Designated at 33 is the second accommodating case according to the second embodiment which is provided between the first accommodating case 31 and the fuel tank 12. This second accommodating case 33 is formed as a box-shaped structure which is flat in the front-rear direction by a front surface 33A, a rear surface 33B, a left surface 33C, a right surface 33D, an upper surface 33E and a lower surface 33F. A wide range from the front surface 33A to the rear side of the upper surface 33E of the second accommodating case 33 defines an opening 33G. This opening 33G is provided at a position corresponding to a water supply port 35G in a reducing agent tank 35 which will be described later.

A second cover 33H is provided ranging from the front side to the upper side of the second accommodating case 33 at a position where it closes the opening 33G. The second cover 33H is formed as a plate body which has been bent to an L-shape by a front cover portion 33H1 and an upper cover portion 33H2. The upper cover portion 33H2 of the second cover 33H is mounted to a rear part of the upper surface 33E to be openable/closable (rotatable) via a hinge 33H3 so as to open/close by using the rear side of the upper surface 33E as a fulcrum. The front cover portion 33H1 of the second cover 33H is provided with a lock device 33H4 having a locking function, and therefore it can be locked in a state that the cover 33H is closed and mischief and the like can be prevented in advance.

Further, the upper cover portion 33H2 of the second cover 33H is formed to put foot on it, and the upper surface when getting on the second accommodating case 33 is formed as the upper cover portion 33H2 of this cover 33H. Therefore, the position of the upper surface 33E (that is, the upper cover portion 33H2) of the second accommodating case 33 is set to a position higher than the upper surface 31E of the first accommodating case 31 by a height dimension H5 and lower than the upper surface plate 12E of the fuel tank 12 by a height dimension H6. As a result, the upper cover portion 33H2 of the second cover 33H forms a high-stage third step following the upper surface 31E of the first accommodating case 31. This upper cover portion 33H2 is provided with a slip-preventing plate 33J as a slip-preventing member.

A tank accommodating space 34 is defined in the second accommodating case 33. This tank accommodating space 34 can be formed having a large volume by using the whole space in the second accommodating case 33. A reducing agent tank 35 which will be described later is accommodated in this tank accommodating space 34.

The inside of the second accommodating case 33 is defined as the tank accommodating space 34, and for example, a front-side area of the lower surface 33F is mounted to the support bracket 31K of the first accommodating case 31 by using the bolts 14, and a rear-side area of the lower surface 33F is mounted to the extension beams 5D of the revolving frame 5 by using the bolts 14. Further, in a state that the second accommodating case 33 has been demounted from the first accommodating case 31, an inserting/removing space (not shown) which is almost the same as the inserting/removing space 18 according to the first embodiment can be formed between the fuel tank 12 and the first accommodating case 31.

Indicated at 35 is the reducing agent tank accommodated in the tank accommodating space 34 in the second accommodating case 33. This reducing agent tank 35 is adapted to store urea water to be supplied to the exhaust gas purifying device 19. The reducing agent tank 35 is formed as a box-shaped structure having a height dimension with which it fits in the tank accommodating space 34. The reducing agent tank 35 is configured by a front surface 35A, a rear surface 35B, a left surface 35C, a right surface 35D, an upper surface 35E and a lower surface 35F. A water supply port 35G for supplying the urea water is provided in an upper part position of the front surface 35A or a front part position of the upper surface 35E. This water supply port 35G is provided so as to be open diagonally upward toward the front side, and therefore the urea water can be readily replenished from the front side by removing a cap 35G1 in a state that the cover 33H of the second accommodating case 33 is opened.

Here, since the reducing agent tank 35 according to the second embodiment can be accommodated alone in the tank accommodating space 34 in the second accommodating case 33, the reducing agent tank 35 has a capacity sufficient to store the urea water of the amount required for long-time operation. Incidentally, a reducing agent supply pump and a reducing agent supply line (none of them is shown) are connected to the reducing agent tank 35.

Thus, also in the second embodiment so configured, the operational effect which is almost the same as that in the aforementioned first embodiment can be obtained. That is, according to the second embodiment, the first accommodating case 31 and the second accommodating case 33 are provided independently and only the reducing agent tank 35 can be accommodated in the tank accommodating space 34 in the second accommodating case 33. As a result, the urea water can be readily replenished into the reducing agent tank 35. In addition, since the space in the second accommodating case 33 can be used only by the reducing agent tank 35, the number of times of the urea water replenishing work can be reduced by increasing the size of the reducing agent tank 35. Since rain water and snow do not fall on the reducing agent tank 35 accommodated in the second accommodating case 33, the durability against damage and corrosion can be improved and the urea water can be made to hardly freeze.

On the other hand, since the first accommodating case 31 is provided only for accommodating the tool box 23 and the like, the tool box 23 and the like disposed in the article accommodating space 32 in the first accommodating case 31 can be readily taken in/out.

In addition, since the first accommodating case 31 and the second accommodating case 33 can be used as the stairway, in a case where the fuel filling work and the like are to be performed, he or she can readily get on the upper revolving structure 3 and readily get off the upper revolving structure 3 by using them as the stairway.

Since the water supply port 35G of the reducing agent tank 35 is open diagonally upward toward the front side, the urea water level can be replenished from the front-side position where it can be readily replenished by getting on the lower traveling structure 2. Further, since the cover 33H of the second accommodating case 33 which covers the water supply port 35G is provided with the lock device 33H4 having the locking function, the tool box 23 and the like in the first accommodating case 31 can be protected from mischief. Likewise, the tool box 23 and the like in the first accommodating case 31 can be also protected.

It should be noted that, in the first embodiment, the fuel tank 12 for storing fuel is exemplified as the oil storage tank and description has been made by giving the case where the first accommodating case 13 and the reducing agent tank 20 are arranged on the front side of this fuel tank 12 as an example. However, the present invention is not limited to this and may be configured that the hydraulic oil tank 11 is provided on the front side of the fuel tank 12 and the first accommodating case 13 and the reducing agent tank 20 are arranged on the front side of this hydraulic oil tank 11. This configuration can be also applied to the second embodiment similarly.

In the first embodiment, description has been made by giving the case where the cab 10 is provided on the left side of the revolving frame 5 with the working mechanism 4 interposed, and the hydraulic oil tank 11, the fuel tank 12, the first accommodating case 13, and the second accommodating case 16 are provided on the right side of the revolving frame 5 as an example. However, the present invention is not limited to this and may be configured that the cab 10 is provided on the right side of the revolving frame 5, and the hydraulic oil tank 11, the fuel tank 12, the first accommodating case 13, and the second accommodating case 16 are provided on the left side of the revolving frame 5. This configuration can be also applied to the second embodiment similarly.

In the second embodiment, description is made by giving the case where the reducing agent tank 35 is provided on the lower surface 33F of the second accommodating case 33 as an example. However, the present invention is not limited to this and as shown by a two-point chain line in FIG. 10, for example, the lower surface 33F of the second accommodating case 33 may be formed as a bottomless structure so as to expand a part of the tank accommodating space 34 and to extend a part of the reducing agent tank 35 accommodated in the second accommodating case 33 downward to the under cover 5J of the revolving frame 5. In this case, the capacity of the reducing agent tank 35 can be increased down to the part shown by the two-dot chain line.

Further, in each of the embodiments, description has been made by giving the crawler type hydraulic excavator 1 as an example of the construction machine. However, the present invention is not limited to this, and may be also applied to a wheel type hydraulic excavator. It can be widely applied to other construction machines such as a hydraulic crane and the like other than them.

DESCRIPTION OF REFERENCE NUMERALS

1: Hydraulic excavator (Construction machine)
2: Lower traveling structure
3: Upper revolving structure
4: Working mechanism
4A: Boom
4A1: Foot portion
4C: Connecting pin
5: Revolving frame
5B: Left vertical plate
5B1, 5C1: Mounting bracket
5C: Right vertical plate
5J: Under cover
11: Hydraulic oil tank (Oil storage tank)
12: Fuel tank (Oil storage tank)
12A: Front surface plate (Front end)
12B: Rear surface plate
12C: Left surface plate
12D: Right surface plate
12E: Upper surface plate
12F: Lower surface plate
12G: Oil filling opening
13, 31: First accommodating case
13A, 16A, 20A, 31A, 33A, 35A: Front surface
13B, 16B, 20B, 31B, 33B, 35B: Rear surface
13C, 16C, 20C, 31C, 33C, 35C: Left surface
13D, 16D, 20D, 31D, 33D, 35D: Right surface
13E, 16E, 20E, 31E, 33E, 35E: Upper surface
13F, 16F, 20F, 31F, 33F, 35F: Lower surface
13G, 16G, 31G, 33G: Opening
13H, 31H: First cover
13H1, 16H3, 31H1, 33H3: Hinge
13J, 16J, 31J, 33J: Slip-preventing plate (Slip-preventing member)
15, 34: Tank accommodating space
16, 33: Second accommodating case
16H, 33H: Second cover
16H2, 33H2: Upper cover portion (Upper surface)
17, 32: Article accommodating space
18: Inserting/removing space
19: Exhaust gas purifying device
20, 35: Reducing agent tank
20H, 35G: Water supply port
21: Reducing agent supply pump
22: Reducing agent supply line
23: Tool box (Article)
24: Urea water bottle (Article)
H1, H4; Height dimension between the footstep plate of the revolving frame and the upper surface of the first accommodating case
H2, H5: Height dimension between the upper surface of the first accommodating case and the upper surface of the second accommodating case
H3, H6: Height dimension between the upper surface of the second cover of the second accommodating case and the upper surface plate of the fuel tank

The invention claimed is:

1. A construction machine comprising:
an automotive lower traveling structure;
an upper revolving structure which is revolvably loaded on said lower traveling structure; and
a working mechanism which is tiltably provided on the front side of said upper revolving structure at an intermediate position in a left-right direction, wherein:
said upper revolving structure is equipped with a revolving frame located on the front side and provided with mounting brackets adapted to mount said working mechanism to the intermediate position in the left-right direction via a connecting pin, and an oil storage tank a front end of which is located more rearward than said mounting brackets of said revolving frame and which is arranged by being put aside to one side in the left-right direction of said revolving frame,
a first accommodating case which is located more forward than said storage tank and is small in a height dimension of an upper surface is provided on one side in the left-right direction of said revolving frame,
a second accommodating case the position of an upper surface of which is higher than said upper surface of said first accommodating case and lower than an upper surface of said oil storage tank is provided on the rear side of said upper surface of said first accommodating case or between said first accommodating case and said oil storage tank, an article accommodating space for accommodating articles is defined in one accommodating case of said first accommodating case and said second accommodating case, and a reducing agent tank which is located in a tank accommodating space and stores a liquid reducing agent is provided in the other accommodating case of said first accommodating case and said second accommodating case.

2. The construction machine according to claim 1, wherein said second accommodating case is provided to be mountable/demountable to/from said first accommodating case, and an inserting/removing space adapted to insert/remove said connecting pin which connects said working mechanism to said mounting brackets is formed by demounting said second accommodating case.

3. The construction machine according to claim 1, wherein said revolving frame is provided with an under cover located on the bottom side, and said tank accommodating space is formed as a space between said upper surface of said first accommodating case and said under cover.

4. The construction machine according to claim 1, wherein a water supply port is provided in said reducing agent tank so as to be open toward the front side or upper side, and an openable/closable cover in said respective accommodating cases is provided on said accommodating case in which said reducing agent tank is provided at a position where said accommodating case covers the water supply port of said reducing agent tank.

5. The construction machine according to claim 1, wherein a first cover for opening/closing an opening is provided on said first accommodating case, and a second cover for opening/closing an opening is provided on said second accommodating case.

6. The construction machine according to claim 1, wherein a first cover which is opened/closed using a corner between a front surface and said upper surface as a fulcrum is provided on said first accommodating cover, a second cover which is opened/closed using said rear side of an upper surface as a fulcrum is provided on said second accommodating case, a first slip-preventing member is provided on said upper surface of said first accommodating case, and a second slip-preventing member is provided on an upper surface of said second cover on said second accommodating case.

7. The construction machine according to claim 1, wherein said second accommodating case is arranged superposing on said upper surface of said first accommodating case, said tank accommodating space is provided in said first accommodating case located on the lower side, and said reducing agent tank is accommodated in the tank accommodating space.

8. The construction machine according to claim 7, wherein a reducing agent supply pump for supplying a liquid reducing agent in said reducing agent tank to an exhaust gas purifying device is provided in said first accommodating case, and said reducing agent supply pump is arranged between a rear surface of said reducing agent tank and a rear surface of said first accommodating case.

* * * * *